US008339632B2

(12) United States Patent
Wasamoto et al.

(10) Patent No.: US 8,339,632 B2
(45) Date of Patent: Dec. 25, 2012

(54) FISCAL PRINTER

(75) Inventors: Tsuyoshi Wasamoto, Nagano-ken (JP); Takaaki Murasawa, Nagano-ken (JP); Toshiaki Watanabe, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 578 days.

(21) Appl. No.: 12/628,268

(22) Filed: Dec. 1, 2009

(65) Prior Publication Data

US 2010/0134821 A1 Jun. 3, 2010

(30) Foreign Application Priority Data

Dec. 3, 2008 (JP) ................................ 2008-308258

(51) Int. Cl.
*G06K 15/00* (2006.01)
*G06F 3/12* (2006.01)

(52) U.S. Cl. ...................... 358/1.14; 358/1.16; 358/1.15

(58) Field of Classification Search ........................ None
See application file for complete search history.

(56) References Cited

U.S. PATENT DOCUMENTS 7,100,210 B2 * 8/2006 Kuo et al. ....................... 726/34
7,523,320 B2 4/2009 Hodder et al.
7,913,097 B2 * 3/2011 Hodder et al. ................ 713/194
2004/0255141 A1 * 12/2004 Hodder et al. ................ 713/200
2005/0086433 A1 * 4/2005 Okaue et al. .................. 711/115
2008/0148415 A1 * 6/2008 Kirschner et al. .............. 726/35
2009/0033980 A1 * 2/2009 Morris et al. ................ 358/1.15
2010/0301994 A1 * 12/2010 Wasamoto ..................... 340/5.2
2011/0154077 A1 * 6/2011 Wasamoto et al. ........... 713/322
2011/0167277 A1 * 7/2011 Kitamura et al. ............. 713/189

FOREIGN PATENT DOCUMENTS

JP 05120567 5/1993
JP 08161644 6/1996
JP 2008242907 10/2008
JP 2008276593 11/2008

* cited by examiner

*Primary Examiner* — Dov Popovici

(57) ABSTRACT

A fiscal printer reliably stores and holds, using a simple configuration, the date and time that a fiscal control circuit board is removed from the printer, and provides excellent security so that improper activities can be reliably discovered. The fiscal printer 1 has a removable fiscal control circuit board 4, and mounted thereon are fiscal memory 8, a backup battery power supply 11, a real-time clock 10, and a detection circuit 15 for detecting removal of the fiscal control circuit board 4. The real-time clock 10 includes an input terminal 10*b*(1) to which detection signals from the detection circuit 15 are input, and a storage unit 10*c* that, when a detection signal indicating that the fiscal control circuit board 4 was removed is input, stores data indicating that the fiscal control circuit board 4 was removed correlated to and associated with the time when the detection signal was input.

6 Claims, 1 Drawing Sheet

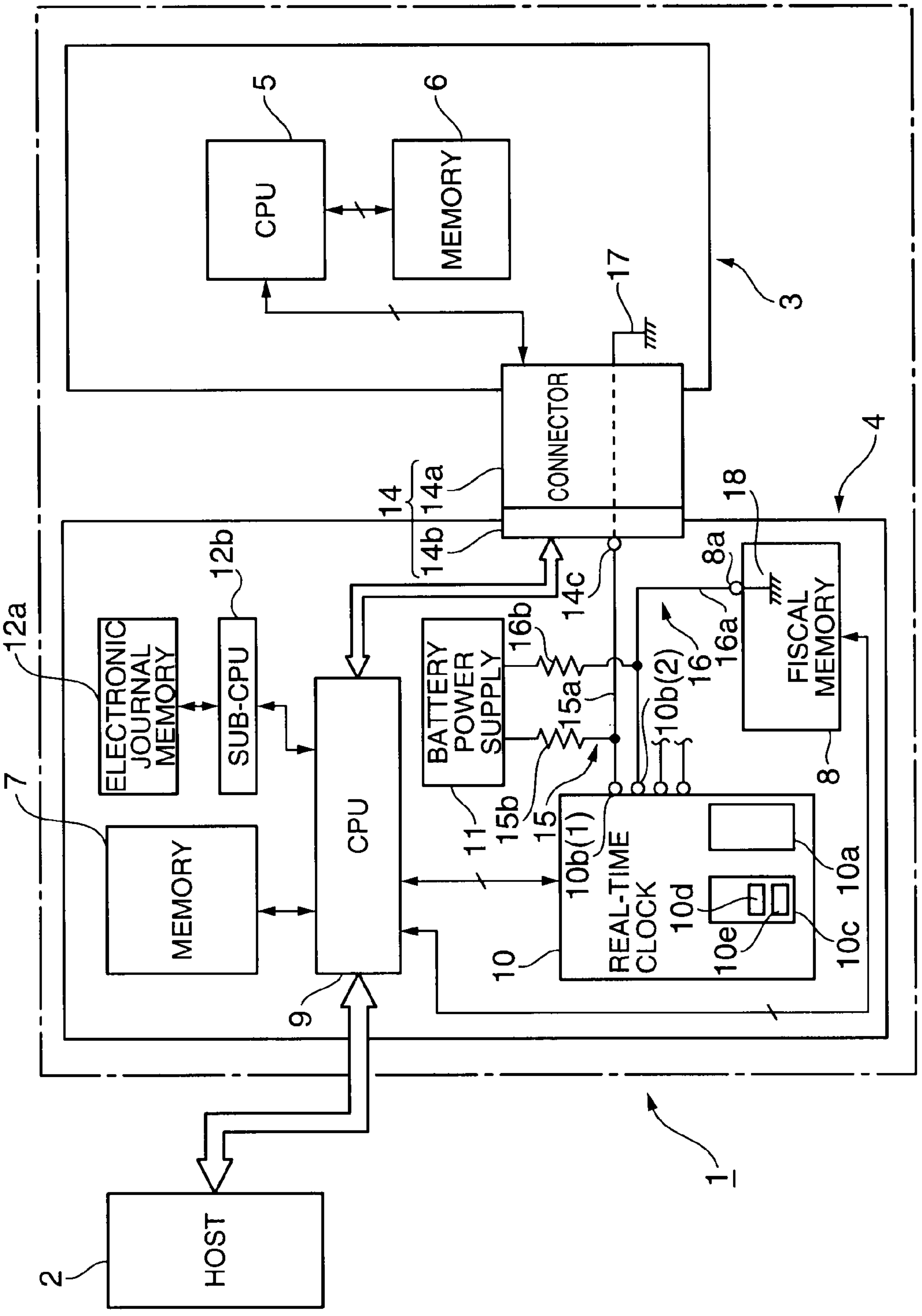
CPU
MEMORY
CONNECTOR
ELECTRONIC JOURNAL MEMORY
SUB-CPU
BATTERY POWER SUPPLY
FISCAL MEMORY
MEMORY
CPU
REAL-TIME CLOCK
HOST
1
2
3
4
5
6
7
8
8a
9
10
10a
10b(1)
10b(2)
10c
10d
10e
11
12a
12b
14
14a
14b
14c
15
15a
15b
16
16a
16b
17
18

FISCAL PRINTER

CROSS-REFERENCE TO RELATED APPLICATIONS

Japanese Patent application No. 2008-308258, filed Dec. 3, 2008, is hereby incorporated by reference in its entirety.

BACKGROUND

1. Field of Invention

The present invention relates to a fiscal printer that prints receipts, for example, and stores and holds fiscal information related to sales transactions in fiscal memory.

2. Description of Related Art

In addition to simply printing text data similarly to common printers, fiscal printers also store and hold transaction information, referred to herein as “fiscal information,” such as the sale and the tax amounts, related to product sales transactions, for example. Fiscal printers are commonly used as cash register printers in point-of-sales (POS) systems, for example. The fiscal information to be stored is generally defined by the laws of the country or locale, and is stored in a storage unit called a “fiscal memory.” Japanese Unexamined Patent Appl. Pub. JP-A-H05-120567 and Japanese Unexamined Patent Appl. Pub. JP-A-H08-161644 disclose cash registers having a fiscal memory for storing and holding fiscal information. Japanese Unexamined Patent Appl. Pub. JP-A-2008-276593 discloses a fiscal printer that has fiscal memory.

Because the fiscal information may be used as data for tax audits, the fiscal information is stored in fiscal memory that is typically a nonvolatile memory sealed in a tamperproof plastic casing so that the information cannot be accessed and changed externally. U.S. Pat. No. 7,523,320 discloses a fiscal data recorder with a protection circuit and tamper-proof seal. The fiscal memory is attached to a fiscal control circuit board, which is separate from the printer control circuit board, and the fiscal control circuit board is removably mounted in the printer so that the circuit board can be installed and removed as needed. A worker having the appropriate authority can remove the fiscal control circuit board from the fiscal printer and can read the stored data from the fiscal memory.

In addition to being removed from the fiscal printer in order to read data from the fiscal memory, the fiscal control circuit board may also be removed for maintenance, such as when there is a bug in a program installed in ROM attached to the fiscal control circuit board, for example. For security, it is therefore desirable to record and store in such fiscal printers the date and time that the fiscal control circuit board is removed, and to enable confirmation, based on the date and time that the circuit board was removed, whether the fiscal control circuit board was removed by a proper authority or whether the fiscal control circuit board was removed in order to tamper with or illegally read data from the fiscal memory.

SUMMARY OF INVENTION

An object of the present invention is to provide a highly secure fiscal printer that, using a simple configuration, can reliably store and hold the date and time that a fiscal control circuit board is removed from the printer so that improper activities can be reliably discovered.

A first aspect of the invention is a fiscal printer including a printer control circuit board on which a printer control unit that controls a printing operation is mounted; fiscal memory for storing and holding fiscal information; a real-time clock; a fiscal control circuit board that is removably mounted in the printer; and a detection circuit that detects removal of the fiscal control circuit board from the printer. The fiscal memory and the real-time clock are mounted on the fiscal control circuit board. The real-time clock has an input terminal to which a detection signal from the detection circuit is input, and a storage unit that, when the detection signal indicating that the fiscal control circuit board was removed from the printer is input to the input terminal, stores data indicating removal of the fiscal control circuit board and the time when the detection signal was input in association with each other.

This aspect of the invention uses the real-time clock mounted on the fiscal control circuit board to record the date and time that the fiscal control circuit board is removed. As a result, an input terminal to which is input a detection signal indicating that the fiscal control circuit board was removed, and a storage function for storing and holding data denoting that the detection signal was input together with the detection signal input time, are included with the real-time clock. As a result, a mechanism for detecting and storing information denoting that the fiscal control circuit board was removed can be formed easily and compactly at a low cost.

The fiscal printer may further include a backup battery power supply that is mounted on the fiscal control circuit board and a first connector part that is generally mounted on the fiscal control circuit board and is removably electrically connected to a second connector part on the printer control circuit board so that they can be disconnected. The fiscal memory is mounted on the fiscal control circuit board packaged in a plastic overmolding, and can only be accessed through the first connector part. The configuration described below can be used as the detection circuit.

That is, one end of a detection line on the fiscal control circuit board is connected through the second connector part to a ground terminal (ground line) on the printer control circuit board, and the other end of the detection line is parallel connected to the input terminal of the real-time clock and to the high potential side of the backup battery power supply through a pull-up resistance.

With the detection circuit thus comprised, when the fiscal control circuit board is installed in the printer, or more specifically when the first and second connector parts are connected to each other, the one end of the detection line of the detection circuit is grounded on the printer control circuit board side, and the input terminal of the real-time clock is held to the low level, that is, the ground potential. When the fiscal control circuit board is then removed from the printer, the ground-side connection of the detection line is broken and the input terminal rises to the high level, which is the pull-up potential, of the pull-up resistance. Triggered by the rise in the detection signal, the current time is written to the storage unit in the real-time clock. The advantages of this detection circuit include a small circuit scale, simple circuit configuration, and low power consumption.

The fiscal memory may be removed from the fiscal control circuit board of the fiscal printer. Saving and holding a fiscal memory removal history is therefore desirable so that when the fiscal memory is removed it can be determined whether the fiscal memory was removed with proper authority or as part of an improper or illegal action.

The fiscal printer according to the invention therefore preferably has a second detection circuit on the fiscal control circuit board that detects removal of the fiscal memory from the fiscal control circuit board. The real-time clock has a second input terminal to which a detection signal from the second detection circuit is input, and a second storage unit that, when the detection signal indicating that the fiscal memory was removed from the fiscal control circuit board is input to the second input terminal, stores data indicating that the fiscal memory was removed and the time when the detection signal was input in association with each other.

The configuration described below can be used as the second detection circuit. That is, a ground connection terminal on the fiscal memory and one end of a detection line on the fiscal control circuit board are disconnectably connected, and the other end of the detection line is parallel connected to the second input terminal and the high potential side of the backup battery power supply through a second pull-up resistance. Similarly to the foregoing fiscal control circuit board removal detection circuit, this second detection circuit can be formed compactly with a simple configuration and has low power consumption.

A fiscal printer according to the invention uses the real-time clock mounted on the fiscal control circuit board to record the date and time that the fiscal control circuit board is removed. As a result, the real-time clock has an input terminal to which is input a detection signal indicating that the fiscal control circuit board was removed, and a storage function for storing and holding data denoting that the detection signal was input together with the detection signal input time. Therefore, unlike configurations that have a detection mechanism such as a mechanical switch or an optical switch for detecting removal of the fiscal control circuit board, the invention enables rendering a mechanism for detecting and storing information denoting that the fiscal control circuit board was removed by means of a simple, compact, low cost configuration with low power consumption.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a block diagram showing the control system of a fiscal printer according to the invention.

DESCRIPTION OF THE PREFERRED EMBODIMENTS

A preferred embodiment of a fiscal printer according to the present invention is described below with reference to the accompanying figures.

FIG. 1 is a block diagram showing the main parts of the control system of a fiscal printer according to this embodiment of the invention. The fiscal printer 1 is connected to a host computer 2 of a point-of-sales (POS) system, and prints printing information related to a sales transaction supplied from the host computer 2 to issue a receipt. The fiscal printer 1 also stores and holds the fiscal information related to the sales transactions that are supplied from the host computer 2 each time a transaction is processed, for example.

The fiscal printer 1 has a printer control circuit board 3 and a fiscal control circuit board 4. For general printing operations, a printer control CPU 5, which has a printer control function similar to a general purpose printer, and flash memory (flash ROM) 6, which is rewritable nonvolatile memory in which printer control firmware, for example, is stored, are attached to the printer control circuit board 3.

Program memory 7 utilizing flash memory or OTP-EPROM, for example, for storing a fiscal control program, fiscal memory 8 utilizing flash ROM, for example, for storing and holding fiscal information, a fiscal memory writing control CPU 9 with a fiscal memory writing control function, a real-time clock (RTC) 10, and a backup battery power supply 11 are attached to the fiscal control circuit board 4. The fiscal memory writing control CPU 9 has an interface function for exchanging information with the host computer 2, and an interface function for exchanging information with the printer control CPU 5.

Electronic journal (EJ) memory 12*a* for storing and holding receipt content, and a sub-CPU 12*b* for electronic journal memory control, are attached to the fiscal control circuit board 4. The sub-CPU 12*b* for electronic journal memory control communicates with the fiscal memory writing control CPU 9, and receives information related to receipt content and stores and holds the received information in the electronic journal memory 12*a* each time a receipt is issued by the fiscal printer 1.

The fiscal control circuit board 4 is removably installed in the printer, and is electrically connected to the printer control circuit board 3 through a disconnectable connector 14. The connector 14 includes a printer-side connector 14*a* (second connector part) that is attached to the printer control circuit board 3, and a fiscal-side connector 14*b* (first connector part) that is attached to the fiscal control circuit board 4, and the printer-side connector 14*a* and fiscal-side connector 14*b* are connected such that they can be disconnected from each other. The fiscal memory 8 is mounted on the fiscal control circuit board packaged in a plastic overmolding, and can only be accessed through the fiscal-side connector 14*b*.

Also attached to or etched into the fiscal control circuit board 4 is a detection circuit 15 that detects removal of the fiscal control circuit board 4 from the printer, that is, detects if the connectors 14*a* and 14*b* are disconnected from each other. A second detection circuit 16 that detects removal of the fiscal memory 8 from the fiscal control circuit board 4 is also provided.

The real-time clock 10 has a common clock circuit 10*a* that keeps the current time using an internal crystal oscillator, and input terminals 10*b*(1) and 10*b*(2) to which detection signals from the detection circuit 15 and second detection circuit 16, respectively, are input. The real-time clock 10 also has a storage unit 10*c* utilizing SRAM, for example, for storing, based on the input detection signals, the date and time the fiscal control circuit board 4 was removed (stored in area 10*d*) and the date and time the fiscal memory 8 was removed (stored in area 10*e*).

The detection circuit 15 has a detection line 15*a* on the fiscal control circuit board 4, and one end of this detection line 15*a* is connected to a ground terminal 14*c* in the fiscal-side connector 14*b*. The ground terminal 14*c* is connected through the printer-side connector 14*a* to a ground terminal (ground line) 17 on the printer control circuit board 3 side (the printer side). The other end of the detection line 15*a* is connected to input terminal 10*b*(1) of the real-time clock 10, and through a pull-up resistance 15*b* to the backup battery power supply 11.

When the fiscal control circuit board 4 is installed in the printer (resulting in connectors 14*a* and 14*b* being connected to each other), the input terminal 10*b*(1) of the real-time clock 10 is held to a low level (ground potential). When the fiscal control circuit board 4 is removed and connectors 14*a* and 14*b* are disconnected from each other, the input terminal 10*b*(1) goes to a high level (a high potential regulated by the pull-up resistance 15*b*).

The real-time clock 10 is thereby notified that the fiscal control circuit board 4 has been removed because the input terminal 10*b*(1) changes from the low level to the high level. Triggered by the input terminal 10*b*(1) going from the low level to the high level, data indicating that the fiscal control circuit board 4 was removed is stored in storage area 10*d* of the storage unit 10*c* correlated to the time that such removal was detected. Historical information showing the dates and times that the fiscal control circuit board 4 was removed thus accumulates in the real-time clock 10. Whether the fiscal control circuit board 4 was removed with proper authority, or whether it was removed without proper authority, can thus be differentiated by checking this historical information, and improper activities can thus be reliably discovered. The security of the fiscal data can thus be improved.

The second detection circuit 16 for detecting removal of the fiscal memory 8 is configured identically to the detection circuit 15 described above. One end of the detection line 16*a* of the second detection circuit 16 is connected to a ground terminal 8*a* in the fiscal memory 8. The ground terminal 8*a* is connected through the internal wiring of the fiscal memory 8 to the ground terminal (ground line) 18 of the fiscal memory 8 or to the ground terminal (ground line) 18 of the fiscal control circuit board 4. Alternatively, the fiscal memory 8 may be mounted on the fiscal control circuit board 4 with a terminal member for mounting the fiscal memory 8 configured to connect one end of the detection line 16*a* to the wiring pattern of the ground terminal (ground line wiring pattern) 18 on the fiscal control circuit board 4. In this alternative the ground terminal 18 is on fiscal control circuit board 4 rather than fiscal memory 8. The other end of the detection line 16*a* is connected to the input terminal 10*b*(2) of the real-time clock 10, and is connected to the backup battery power supply 11 through a second pull-up resistance 16*b*.

Therefore, similarly to the operation of detection circuit 15, the input signal of the input terminal 10*b*(2) of the real-time clock 10 changes to a high level indicating that the fiscal memory 8 was removed when the fiscal memory 8 is removed from the fiscal control circuit board 4. The real-time clock 10 stores and holds data indicating that the fiscal memory 8 was removed correlated to the time of removal in a second storage area 10*e* in the storage unit 10*c*. A history of fiscal memory 8 removal is thus also stored and held in the real-time clock 10, and the security of fiscal data can be further improved.

As described above, the fiscal printer 1 uses a real-time clock 10 that is mounted on the fiscal control circuit board 4 to detect and store removal of the fiscal control circuit board 4 from the fiscal printer 1. A detection mechanism for detecting whether or not the fiscal control circuit board 4 was removed, and storage mechanism for storing the time removal is detected, can thus be achieved at a low cost using a simple circuit configuration.

It should be noted that a detection circuit for detecting removal of the program memory 7 and electronic journal memory 12*a*, for example, may also be provided. This detection circuit can be formed using a configuration identical to the foregoing detection circuits 15 and 16. It should further be noted that storage unit 10*c* can be attached to fiscal control circuit board 4 separately from real-time clock 10.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A fiscal printer comprising:

a fiscal memory for storing and holding fiscal information;

a real-time clock;

a fiscal control circuit board that is removably mounted in the printer; and a detection circuit that detects one of (a) removal of the fiscal control circuit board from the printer and (b) removal of the fiscal memory from the fiscal control circuit board;

wherein the fiscal memory and the real-time clock are mounted on the fiscal control circuit board; and the real-time clock includes:

an input terminal to which a detection signal from the detection circuit is input; and a storage unit that, when the detection signal indicating that one of (a) the fiscal control circuit board was removed from the printer and (b) the fiscal memory was removed from the fiscal control circuit board is input to the input terminal of the real-time clock, stores data indicating one of (a) the removal of the fiscal control circuit board and a time when the detection signal was input in association with each other and (b) the removal of the fiscal memory and a time when the detection signal was input in association with each other;

the fiscal printer further comprising:

a backup battery power supply that is mounted on the fiscal control circuit board; and a first connector part mounted on the fiscal control circuit board that is disconnectably electrically connected to a second connector part mounted on a inter control circuit board; wherein the fiscal memory is configured to be accessible only through the first connector part; and the detection circuit includes a detection line on the fiscal control circuit board, the detection line having one end connected through the second connector part to a ground line on the printer control circuit board, and the other end of the detection line connected to the terminal of the real-time clock and to a high potential side of the backup battery power supply through a pull-up resistance.

2. The fiscal printer described in claim 1, wherein:

the printer control circuit board has mounted thereon a printer control unit that controls a printing operation.

3. A fiscal printer comprising:

a fiscal memory for storing and holding fiscal information;

a real-time clock;

a fiscal control circuit board that is removably mounted in the printer; and a detection circuit that detects one of (a) removal of the fiscal control circuit board from the printer and (b) removal of the fiscal memory from the fiscal control circuit board;

wherein the fiscal memory and the real-time clock are mounted on the fiscal control circuit board; and the real-time clock includes:

an input terminal to which a detection signal from the detection circuit is input; and a storage unit that, when the detection signal indicating that one of (a) the fiscal control circuit board was removed from the inter and (b) the fiscal memory was removed from the fiscal control circuit board is input to the input terminal of the real-time clock stores data indicating one of (a) the removal of the fiscal control circuit board and a time when the detection signal was input in association with each other and (b) the removal of the fiscal memory and a time when the detection signal was input in association with each other;

the fiscal printer further comprising:

a second detection circuit on the fiscal control circuit board that detects the other of the one of (a) the removal of the fiscal control circuit board from the printer and (b) the removal of the fiscal memory from the fiscal control circuit board; and a second input terminal of the real-time clock to which a detection signal from the second detection circuit is input; and a second storage unit that, when the detection signal from the second detection circuit indicating that the other of the one of (a) the fiscal control circuit board was removed from the printer and (b) the fiscal memory was removed from the fiscal control circuit board is input to the second input terminal, stores data indicating the other of the one of (a) the removal of the fiscal control circuit board and a time when the detection signal from the second detection circuit was input in association with each other and (b) the removal of the fiscal memory and a time when the detection signal from the second detection circuit was input in association with each other.

4. The fiscal printer described in claim 3, further comprising a backup battery power supply that is mounted on the fiscal control circuit board, wherein:

the second detection circuit has a ground connection terminal on the fiscal memory, and a detection line on the fiscal control circuit board; and the detection line of the second detection circuit has one end thereof disconnectably connected to the ground connection terminal on the fiscal memory, and the other end thereof parallel connected to the second input terminal and a high potential side of the backup battery power supply through a pull-up resistance.

5. The fiscal printer described in claim 4, wherein:

the ground connection terminal of the fiscal memory is connected through internal wiring in the fiscal memory to a ground line of the fiscal memory or the fiscal control circuit board.

6. The fiscal printer described in claim 4, further comprising:

a mounting terminal member of the fiscal memory for mounting the fiscal memory on the fiscal control circuit board configured to connect a ground line wiring pattern on the fiscal control circuit board to the one end of the detection line of the second detection circuit by mounting the fiscal memory onto the fiscal control circuit board.

* * * * *